United States Patent
Ohara

[19]
[11] Patent Number: 6,100,870
[45] Date of Patent: Aug. 8, 2000

[54] METHOD FOR VERTICAL IMAGING SCALING

[75] Inventor: Kazuhiro Ohara, Richardson, Tex.

[73] Assignee: Texas Instruments Incorporated, Dallas, Tex.

[21] Appl. No.: 08/866,789

[22] Filed: May 30, 1997

Related U.S. Application Data

[60] Provisional application No. 60/018,673, May 30, 1996.

[51] Int. Cl.[7] ......................................................... G09G 5/26
[52] U.S. Cl. .............................. 345/127; 345/84; 345/202
[58] Field of Search ..................................... 348/445, 446, 348/448; 345/202, 127, 128, 129, 130

[56] References Cited

U.S. PATENT DOCUMENTS

| | | | |
|---|---|---|---|
| 4,677,482 | 6/1987 | Lewis Jr. ................................. | 348/448 |
| 5,386,236 | 1/1995 | Hong ....................................... | 348/445 |
| 5,497,199 | 3/1996 | Asada et al. ............................. | 348/446 |
| 5,519,451 | 5/1996 | Clatanoff et al. ........................ | 348/446 |
| 5,534,934 | 7/1996 | Katsumata et al. ...................... | 348/445 |
| 5,537,149 | 7/1996 | Teraoka et al. .......................... | 348/445 |
| 5,548,337 | 8/1996 | Kang ........................................ | 348/445 |
| 5,838,385 | 11/1998 | Reder et al. ............................. | 348/448 |

*Primary Examiner*—Chanh Nguyen
*Assistant Examiner*—Alecia D. Nelson
*Attorney, Agent, or Firm*—Charles A. Bill; Wade James Brady; Richard L. Donaldson

[57] ABSTRACT

A method for operating a scan-line video processor that allows for vertical scaling with no additional memory in a display system and extracts more SVP instructions in vertical down scaling applications. The input and output sync periods of the SVP (16) are controlled such that the SVP (16) produces output lines of interpolated data that is a vertical scaling factor of the input lines. The data is then sent to a memory (24) to correct for centering and time base changes in the interpolated data. Finally, the data is sent to a display device, such as a CRT or a spatial light modulator.

16 Claims, 3 Drawing Sheets

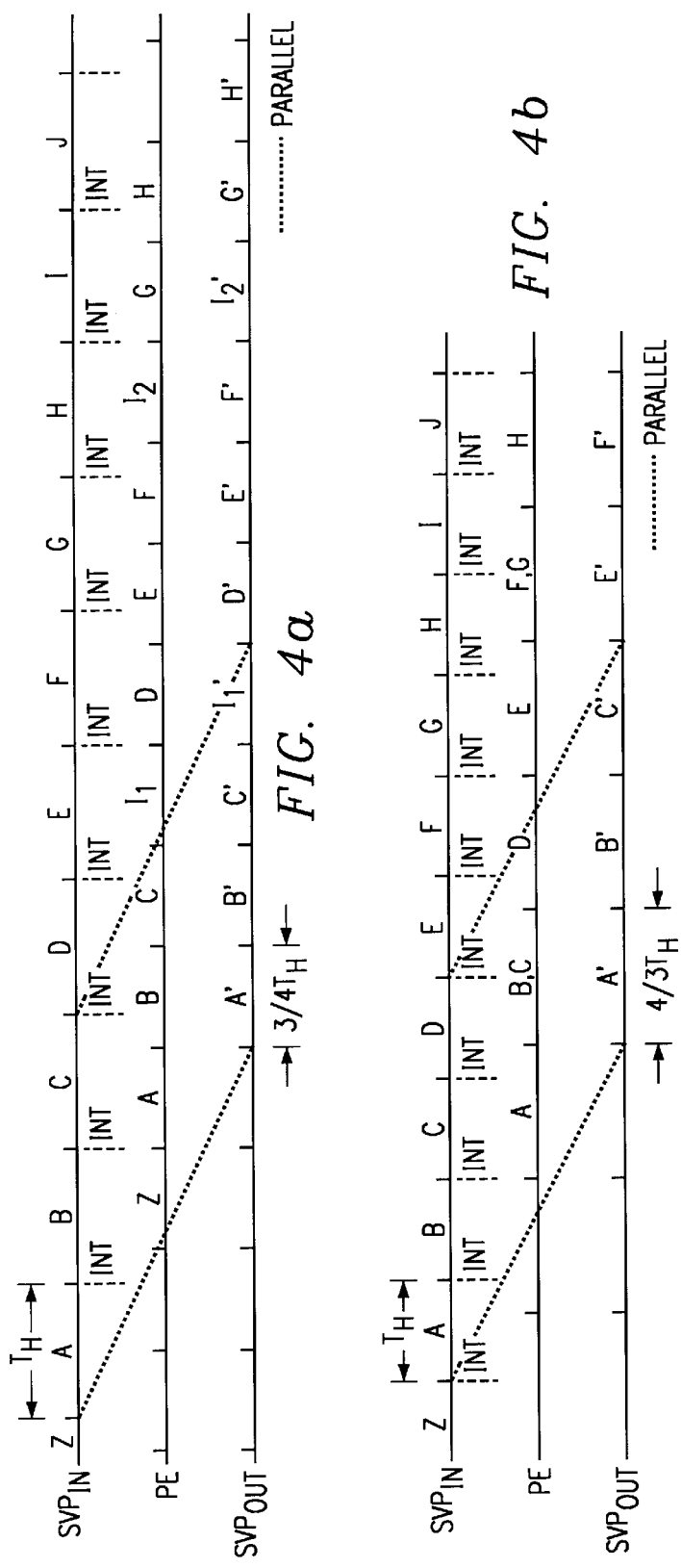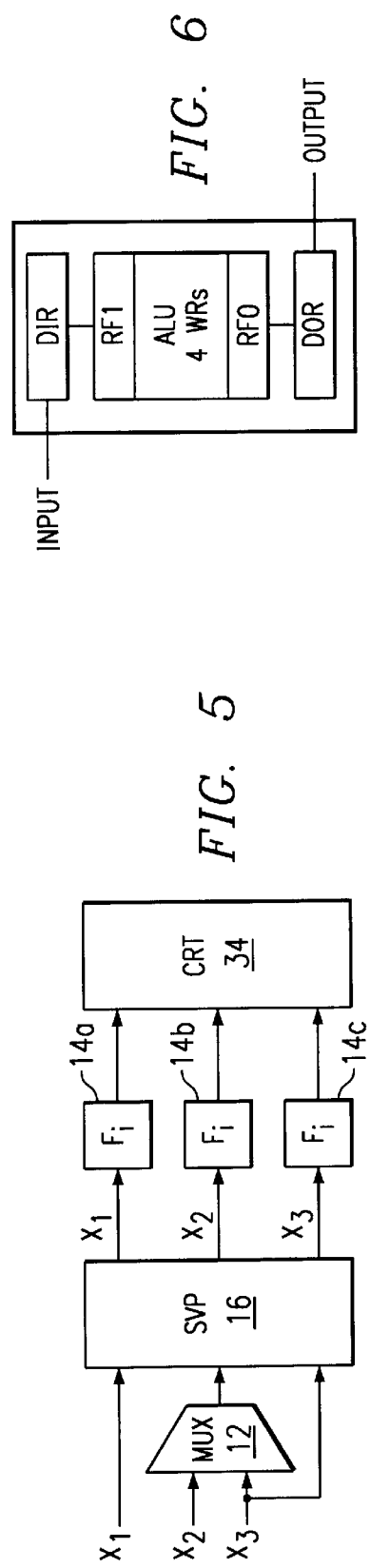

METHOD FOR VERTICAL IMAGING SCALING

This application claims benefit of Provisional Application 60/018,673 filed May 30, 1996.

BACKGROUND OF THE INVENTION

1. Field of the Invention

This invention relates to vertical image scaling, more particularly for vertical image scaling using scan-line video processors.

2. Background of the Invention

As display technology continues to develop, the ability to change the size and aspect ratio of a video image has increased. New lines or picture elements (pixels) of the image are created or lines and pixels are eliminated to scale an image larger or smaller. The processing power and speed available to display systems makes these tasks virtually transparent to the viewer.

While scaling in both the horizontal and vertical dimensions is possible with just about all display technologies, it is used frequently in display devices with spatial light modulators. Spatial light modulators are devices which form images by controlling individual cells, typically one cell on the modulator array per pixel in the final image.

Each modulator cell can be individually controlled, which in turn controls the appearance of the pixel in the displayed image. This individual control allows the data for each pixel to be manipulated. Such manipulations can include generating new pixels (scaling the image larger) or eliminating pixels (making the image smaller).

Scaling in the vertical dimension can be complicated, since the incoming video data is in line format. It typically requires comparison and calculations between the current line, the previous line and the next line of video data. Because of the nature of the incoming video in rasterized format, the previous and current line must be stored until the next line becomes available. Storage of these lines requires memory, which raises the cost of the final display system.

Currently, vertical scaling implementations include extra memories. Each memory must be able to store many lines of video data. For example in a typical NTSC 3:4 upscale, 360 lines must be converted to 480 lines, a 120 line difference. This means that 120 lines of video data must be provided via interpolation, which will require storage of at least 120 lines of data. Memories do not come in 120 line sizes, so a standard field memory, capable of storing an entire field of data must by used.

In a typical scaling algorithm, there are six field memories. One memory is for the red field, one is for the green field, and the third for the blue field before the interpolation processing, for vertical upscaling. The other three field memories are for down scaling after the interpolation processing. This results in an expensive system.

Therefore, some method of vertical scaling is needed that allows a display system to perform vertical scaling without adding more memory to the system, thereby reducing the system's cost.

SUMMARY OF THE INVENTION

One aspect of the invention is a method for controlling a scan-line video processor (SVP) in a display system to allow for vertical scaling of images without the need for additional memories. The data is brought into the SVP at an input sync period. The output sync period is determined by the desired scaling factor, this being the number of input lines to output lines. Using an interrupt function and a dual pointer global rotation (GR) function, the data is then interpolated and output at a separate sync period. The SVP either interpolates the data by creating fewer lines out of more lines, or by creating more lines out of a set of input lines. The method can be applied in either spatial light modulator or CRT display systems.

It is a technical advantage of the invention to eliminate the need for field memories previously required for such techniques. This in turn reduces the system cost and allows vertical scaling to be implemented in less expensive display systems.

It is a further advantage of the invention to extract more SVP processing instructions by using a wider horizontal sync (h-sync) signal which is used for SVP processing and SVP data output controls.

BRIEF DESCRIPTION OF THE DRAWINGS

For a more complete understanding of the present invention and for further advantages thereof, reference is now made to the following Detailed Description taken in conjunction with the accompanying Drawings in which:

FIGS. 4a–4b show graphical representations of one embodiment for generating scaled data in accordance with the claimed invention.

FIG. 5 shows one embodiment of vertical scaling hardware for CRT displays.

FIG. 6 is a block diagram of the hardware structure of the SVP.

DETAILED DESCRIPTION OF THE PREFERRED EMBODIMENTS

Figure 1A:
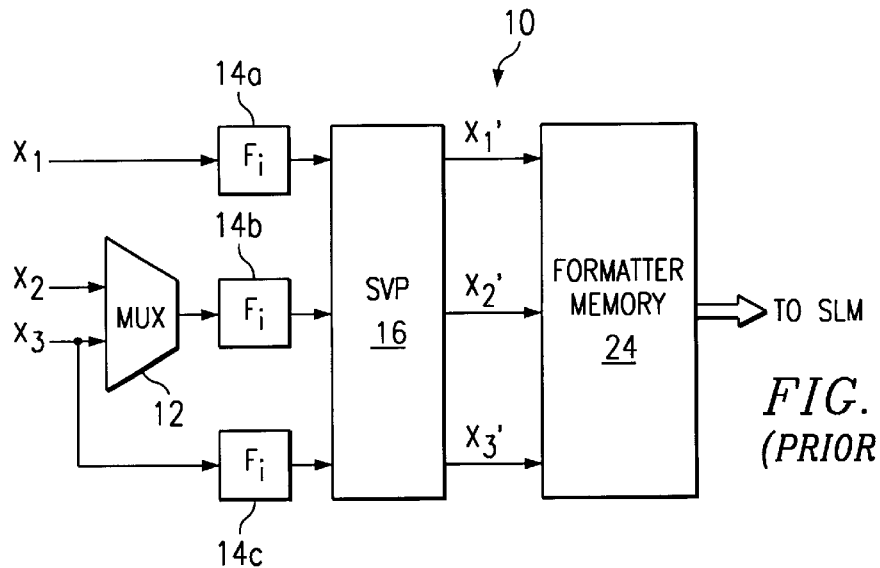
FIGS. 1a–1c show prior art embodiments of vertical scaling hardware using scan-line video processors.
Figure 1B:
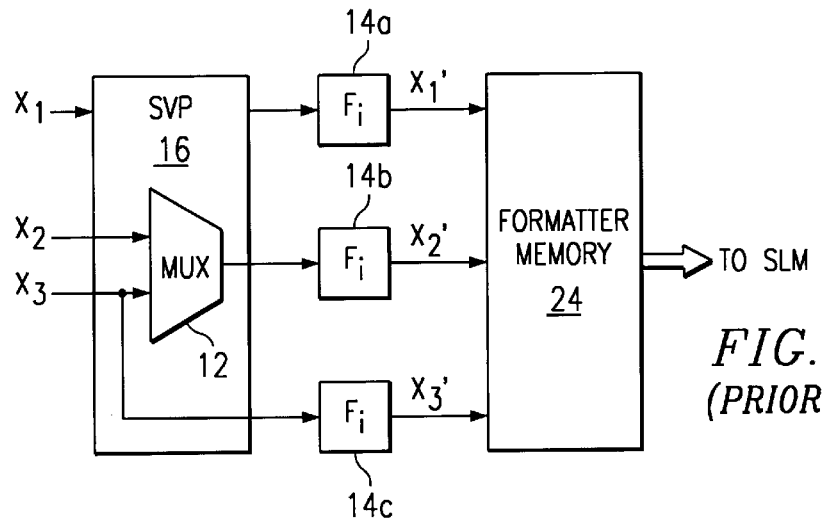
Figure 1C:
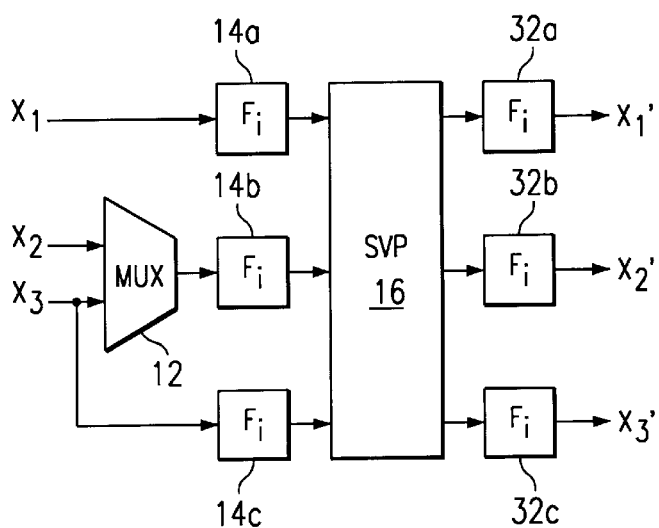

FIGS. 1a–1c show prior art embodiments of systems using scan-line video processors (SVP) to vertically scale data for spatial light modulator displays. In all further discussions, the incoming video signal will be discussed in terms of inputs $X_1$, $X_2$, and $X_3$. These could be in one of several formats, as follows. The methods described in accordance with this invention may be used on any of the above format.

Figure 2A:
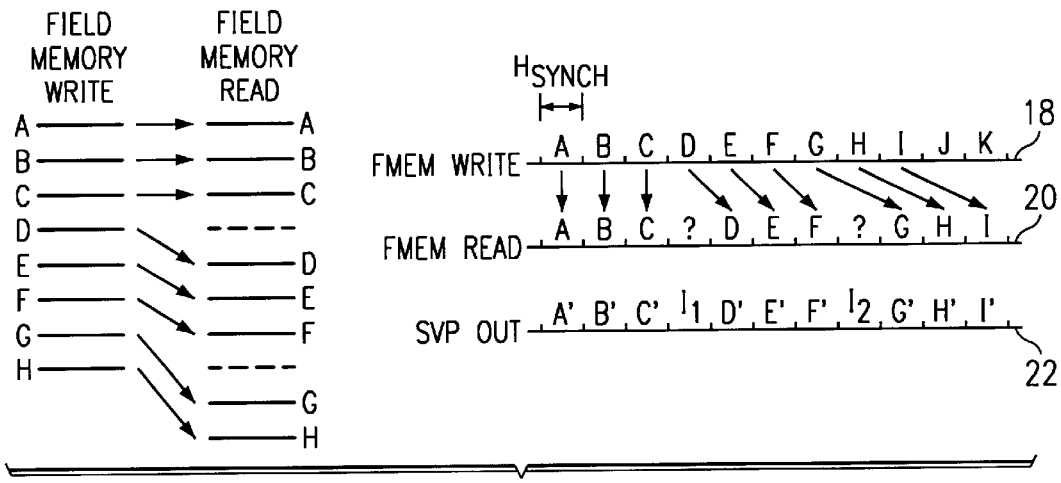
FIGS. 2a and 2b show a graphical representation of one embodiment for generating scaled data in prior art embodiments of vertical scaling.

In FIG. 1a, a prior art implementation 10 of a vertical scaling system for up-scaling a video signal is shown. In this implementation, the scaling factor is 3 to 4 expansion as an example. The inputs to the field memories 14a–14c and the subsequent outputs are shown in FIG. 2a. Inputs $X_2$ and $X_3$ may be multiplexed by multiplexer "MUX" 12 together to save calculation and memory space. If that operation is performed the outputs of the field memory 14b to the SVP 16 would be I/Q for example, in the Y/I/Q input realm as shown above.

As shown in FIG. 2a, the field memories insert a blank or dummy line every fourth line to allow the SVP to calculate the interpolated value, shown in the diagram as dashed lines. With a scaling factor of 3:4, every three input lines must be used to produce 4 interpolated output lines. Hence, the fourth line in this example is the one left blank. It should be noted that the timing of this translation is done with the horizontal sync signal H$_{sync}$, shown above line 18 in FIG. 2a.

The field memory read in FIG. 2a is the same as the SVP input. The SVP output then inserts an interpolated value I$_x$ in the appropriate spaces. This is shown in lines 18, 20 and 22 in FIG. 2a. The outputs of the SVP 16 are the same variables as were input, such as Y/U/V, but now include the extra data for the interpolated values. The outputs are therefore shown in FIG. 1a as X$_1$', X$_2$' and X$_3$'.

In a typical spatial light modulator display, as discussed previously, the data must be formatted from rasterized line input to x-y column format. This can be accomplished by formatter memory 24. The output of the formatter memory is then in the proper format to be sent to the SLM display device. This approach requires 3 field memories just for the up vertical scaling.

Figure 2B:
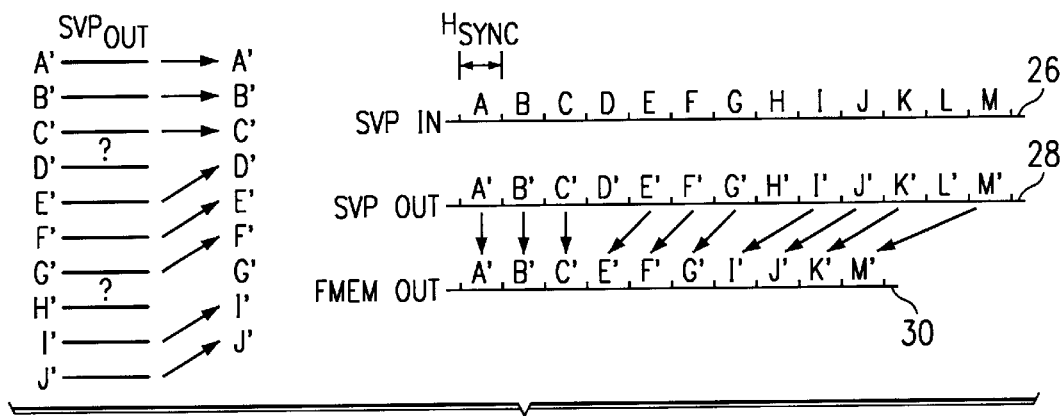

In FIG. 1b, in conjunction with FIG. 2b, the opposite procedure for 4:3 down scaling as typically done in the prior art is shown. Again, the inputs for X$_2$ and X$_3$ can be multiplexed by MUX 12, which can be done within the SVP, as shown. However, in this example, these inputs go directly into the SVP 16. The SVP calculates 3 lines of interpolated data, such as A', B' and C' in FIG. 2b, from the four lines of input A, B, C, and D. This calculated output is then sent to the field memories 14a–14c with the dummy lines inserted for every fourth line. The field memories then eliminate this dummy line and send the down-scaled data to the formatter memory 24. The translational process is shown graphically in FIG. 2b, lines 26, 28 and 30.

In order to have one circuit that implements both up and down scaling, the SVP would have to have field memories 14a–14c on the input side and field memories 32a–32c on the output side, as shown in FIG. 1c. This would allow the circuit to perform whichever of the operations was desired. These six memories raise the price of the system dramatically.

Figure 3:
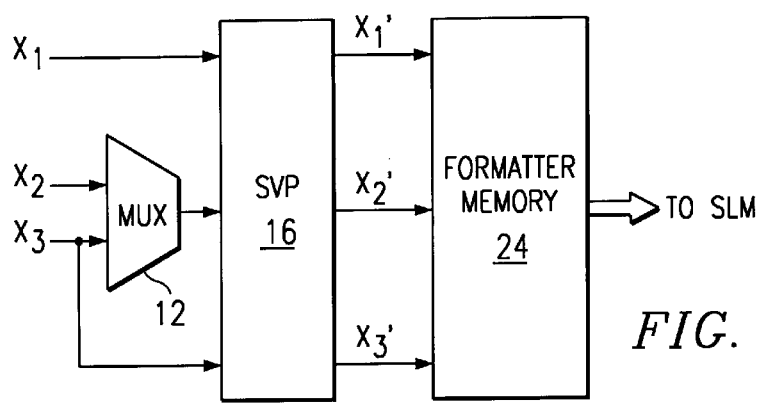
FIG. 3 shows one embodiment of vertical scaling hardware for spatial light modulator displays.

However, using the inherent capabilities of the SVP by applying methods in accordance with the present invention, all six of these memories can be eliminated for spatial light modulator display systems. One embodiment of the present invention is shown in FIG. 3. The system only requires the SVP 16, and the formatter memory 24. If multiplexing the inputs X$_2$ and X$_3$ is desired, MUX 12 could also be done in SVP.

A graphical representation of one embodiment of the invention for vertical up-scaling is shown in FIGS. 4a and 6. In the prior art embodiments discussed above, the horizontal synch signal, H$_{sync}$ and the clock for input and output are all synchronous. That is, the sync period for both the data input register (DIR) and the data output register (DOR) are synchronized. The output sync period could also be double or a multiple of the input sync period for progressive scan conversion, or multi-screen functions.

In this case, the data transfer from DIR to PE (processing element in the SVP) and from PE to DOR are performed in the horizontal blanking period. No processing is performed by the PE during this period. If the data transfer is performed from DIR to PE or from PE to DOR, during horizontal active data periods where the PE is enabled, a memory access conflict occurs, caused by the SVP's hardware structure, single instruction multiple data. For example, and with reference to FIG. 6, a DIR to PE transfer has to access memory (RF1) from the DIR and the PE (ALU) at the same time. When the transfer from DIR to PE occurs, the contents of four working registers (WR) have to be broken by this memory access conflict. However, to avoid memory accessing conflicts within the SVP, a hardware interrupt is available. This feature can be to allow asynchronous operation of the SVP.

In the case of 3 line to 4 lines vertical up scaling, shown in FIG. 4a, the PE calculation and DOR output interval for time-horizontal is ¾ that of the input of the input time-horizontal to maintain real-time processing on the SVP. The input data transfer from DIR to PE (RF1) should be performed by the SVP hardware interrupt function during data calculation by the PE and dual pointer global rotation function.

In the case of 4 lines to 3 lines vertical down scaling, shown in FIG. 4b, the PE calculation and DOR output interval for time-horizontal is 4/3 that of the input time-horizontal to maintain real-time processing on the SVP. The operation by hardware interrupt and dual pointer global rotation is the same as the up scaling example in FIG. 4a.

By using dual-pointer global rotation the interrupted data (for example "A") must be kept over the next sync, since global rotation is performed by each sync for the PE, until "A" is used for the interpolation calculation. "B", "C", and "D" data are interpolated in the same manner. This utilization of the SVP hardware interrupt and dual pointer global rotation are necessary to implement this invention.

The number of input and output pixels are the same at the vertical scaling. The output clock is slowed down to 3/4 that of the input clock frequency. In this down scaling case, however, the same clock (4/3 that of the input clock) is used for vertical up scaling. Using a common clock in the hardware can reduce costs in the system.

This expansion in the PE sync and output sync by 4 to 3 vertical down scaling has another benefit with regard to the number of instructions available for SVP calculations. For an NTSC signal, the horizontal sync period is 63.5 microseconds. The PE clock is 43 MHz as an example. This yields an instruction count of:

$$\frac{(63.5 \times 10^{-6})}{1/(43 \times 10^6)} = (63.5 \times 10^{-6}) \times (43 \times 10^6) = 2730 \text{ instructions.}$$

However, the new sync period is 4/3 that of the input sync period.

$$(63.5 \times 10^{-6}) \times (43 \times 10^6) \times 4/3 = 3640 \text{ instructions.}$$

This results, therefore, in an increased instruction space to be used for signal processing within the SVP.

In this manner, the field memories 14a–14c and 32a–32c can be eliminated completely from a spatial light modulator display, thereby reducing system costs. The time base and the centering of the image is changed by this scheme, but the formatter memory in a spatial light modulator display can adjust to the different time base and correct the centering change.

A further feature of the SVP can be utilized here. The SVP feature called dual pointer global rotation, can emulate a line memory for storing a previous line's data. This is used in embodiments of the invention discussed above to keep the previous line's data until the desired line is calculated, for use in the interpolation process.

The application of this invention is not restricted to spatial light modulator displays. As shown in FIG. 5, the use of 3 field memories 14a–14c can adapt this to a cathode ray tube (CRT) based display. The field memories are used to correct the time base and image centering changes made by the SVP operations, much as the formatter memory does in the spatial light modulator system. It still has the advantage of using only 3 field memories for a system that can do both up and down scaling, rather than 6 memories as in the prior art.

In summary, application of this invention to either spatial light modulator displays or CRT displays results in a reduction of field memories for vertical scaling. This in turn reduces system costs and allows the vertical scaling feature to be implemented on the less expensive display devices, without raising the price.

Thus, although there has been described to this point a particular embodiment for a method and structure for vertical scaling in a display system, it is not intended that such specific references be considered as limitations upon the scope of this invention except in-so-far as set forth in the following claims.

What is claimed is:

1. A method for operating a scan-line video processor within a display system, comprising the steps of:

receiving incoming video data lines at an input horizontal sync period;

manipulating an output horizontal sync period based upon a vertical scaling factor, where said manipulation comprises the steps of:

using an interrupt signal at the end of each interval equal to the input horizontal sync period to interrupt said manipulation of said output horizontal sync period; and controlling a dual pointer global rotation in the scan-line video processor to keep data from a previous line until an interpolated line is created, and to set said output horizontal sync period at a ratio equal to the input horizontal sync period multiplied by the scaling factor to produce output data at said output horizontal sync period, to interpolate said output data to produce the proper number of lines depending upon said vertical scaling factor;

sending said output data to at least one memory;

correcting time base and centering changes as necessary in said output data in conjunction with said memory; and displaying scaled images represented by said output data on a display device.

2. The method of claim 1 wherein said vertical scaling factor reduces the number of lines of output data to down scale said images.

3. The method of claim 1 wherein said vertical scaling factor increases the number of lines of output data to up scale said image.

4. The method of claim 1 wherein said display device further comprises a spatial light modulator device.

5. The method of claim 1 wherein said display device further comprises a CRT.

6. The method of claim 1 wherein said memory further comprises a formatter memory.

7. The memory of claim 1 wherein said memory further comprises field memories.

8. The method of claim 1 wherein a number of available instructions is increased if said scaling factor results in vertical down scaling of said image.

9. A scan-line video processor operating within a display system, comprising:

incoming video data lines for receiving input data at an input horizontal sync period;

circuitry for manipulating an output horizontal sync period based upon a vertical scaling factor which includes:

circuitry for providing an interrupt signal at the end of each interval equal to the input horizontal sync period to interrupt said manipulation of said output horizontal sync period; and circuitry for controlling a dual pointer global rotation in the scan-line video processor to keep data from a previous line until an interpolated line is created, and to set said output horizontal sync period at a ratio equal to the input horizontal sync period multiplied by the scaling factor to produce output data at said output horizontal sync period, to interpolate said output data to produce the proper number of lines depending upon said vertical scaling factor;

at least one memory for receiving said output data;

circuitry for correcting time base and centering changes as necessary in said output data in conjunction with said memory; and a display device for displaying scaled images represented by said output data on a display device.

10. The system of claim 9 wherein said vertical scaling factor reduces the number of lines of output data to down scale said images.

11. The system of claim 9 wherein said vertical scaling factor increases the number of lines of output data to up scale said image.

12. The system of claim 9 wherein said display device further comprises a spatial light modulator device.

13. The system of claim 9 wherein said display device comprises a CRT.

14. The system of claim 9 wherein said memory further comprises a formatting memory.

15. The system of claim 9 wherein said memory further comprises field memories.

16. The system of claim 9 wherein a number of available instructions is increased if said scaling factor results in vertical down scaling of said image.

* * * * *